United States Patent
Kubota et al.

(10) Patent No.: US 10,157,026 B2
(45) Date of Patent: *Dec. 18, 2018

(54) COMMUNICATION SYSTEM, COMMUNICATION DEVICE, AND NON-TRANSITORY COMPUTER-READABLE STORAGE MEDIUM STORING INSTRUCTIONS FOR INFORMATION PROCESSING DEVICE

(71) Applicant: BROTHER KOGYO KABUSHIKI KAISHA, Nagoya, Aichi (JP)

(72) Inventors: Hirotaka Kubota, Nagoya (JP); Yoshitsugu Tomomatsu, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,321

(22) Filed: Sep. 25, 2017

(65) Prior Publication Data

US 2018/0024792 A1    Jan. 25, 2018

Related U.S. Application Data

(63) Continuation of application No. 15/153,523, filed on May 12, 2016, now Pat. No. 9,830,118, which is a (Continued)

(30) Foreign Application Priority Data

Dec. 27, 2013  (JP) ................. 2013-271752

(51) Int. Cl.
G06F 3/12    (2006.01)
H04L 29/08   (2006.01)
(Continued)

(52) U.S. Cl.
CPC .......... *G06F 3/1236* (2013.01); *G06F 3/1204* (2013.01); *G06F 3/1292* (2013.01);
(Continued)

(58) Field of Classification Search
CPC ........................ H04W 4/008; H04L 67/146
(Continued)

(56) References Cited

U.S. PATENT DOCUMENTS 7,023,979 B1   4/2006  Wu et al.
7,080,154 B1   7/2006  Inoue et al.
(Continued)

FOREIGN PATENT DOCUMENTS

CN    102511129 A    6/2012
CN    102685674 A    9/2012
(Continued)

OTHER PUBLICATIONS

Office Action dated Sep. 22, 2017 from related U.S. Appl. No. 15/461,843, 13 pages.
(Continued)

*Primary Examiner* — John J Lee
(74) *Attorney, Agent, or Firm* — Scully, Scott, Murphy & Presser, PC

(57) ABSTRACT

A communication system may comprise an information processing device and a communication device. Communication between the communication device and the information processing device using the first wireless communication scheme may be performed. The communication device may send the connectable network identification information to the information processing device. Communication between the information processing device and the communication device using the second wireless communication scheme and using the second network may be executed, in case that the first network belongs is not included in one or
(Continued)

more networks identified by the connectable network identification information. Communication between the information processing device and the communication device using the second wireless communication scheme and using the first network may be executed, in case that the first network is included in the one or more networks identified by the one or more connectable network identification information.

18 Claims, 7 Drawing Sheets

Related U.S. Application Data continuation of application No. 14/580,473, filed on Dec. 23, 2014, now Pat. No. 9,350,813.

(51) Int. Cl.
| | |
|---|---|
| H04W 40/24 | (2009.01) |
| H04L 12/24 | (2006.01) |
| H04B 7/155 | (2006.01) |
| G06F 17/30 | (2006.01) |
| H04W 76/14 | (2018.01) |
| H04W 4/80 | (2018.01) |
| H04W 48/18 | (2009.01) |
| H04N 1/00 | (2006.01) |
| H04W 88/16 | (2009.01) |

(52) U.S. Cl.
CPC ....... *G06F 17/30887* (2013.01); *H04B 7/155* (2013.01); *H04L 41/0856* (2013.01); *H04L 67/141* (2013.01); *H04N 1/00411* (2013.01); *H04W 4/80* (2018.02); *H04W 40/246* (2013.01); *H04W 48/18* (2013.01); *H04W 76/14* (2018.02); *H04N 2201/006* (2013.01); *H04N 2201/0094* (2013.01); *H04W 88/16* (2013.01)

(58) Field of Classification Search
USPC ...... 455/41.3, 41.2, 41.1, 550.1, 567, 556.2, 455/67.11
See application file for complete search history.

(56) References Cited

U.S. PATENT DOCUMENTS

| | | | |
|---|---|---|---|
| 8,189,225 B1 | 5/2012 | Lo et al. | |
| 8,665,908 B1 | 3/2014 | Vainer et al. | |
| 9,603,114 B2 | 3/2017 | Tanaka | |
| 2004/0252715 A1 | 12/2004 | Noda et al. | |
| 2009/0036056 A1* | 2/2009 | Oshima | H04M 1/7253 455/41.3 |
| 2009/0111378 A1 | 4/2009 | Sheynman et al. | |
| 2011/0050387 A1 | 3/2011 | Kim et al. | |
| 2011/0177780 A1 | 7/2011 | Sato et al. | |
| 2011/0275316 A1* | 11/2011 | Suumaki | G06K 7/10237 455/41.1 |
| 2012/0076107 A1 | 3/2012 | Avital et al. | |
| 2012/0099566 A1 | 4/2012 | Laine et al. | |
| 2012/0100803 A1 | 4/2012 | Suumaki et al. | |
| 2012/0178367 A1 | 7/2012 | Matsumoto et al. | |
| 2012/0257245 A1* | 10/2012 | McCoog | G06F 3/1204 358/1.15 |
| 2012/0265913 A1 | 10/2012 | Suumaki et al. | |
| 2013/0036231 A1 | 2/2013 | Suumaki | |
| 2013/0137373 A1 | 5/2013 | Choi et al. | |
| 2013/0215467 A1 | 8/2013 | Fein et al. | |
| 2013/0258402 A1 | 10/2013 | Arai | |
| 2013/0260683 A1* | 10/2013 | Suzuki | H04W 4/008 455/41.1 |
| 2013/0309968 A1 | 11/2013 | Suzuki | |
| 2013/0309971 A1 | 11/2013 | Kiukkonen et al. | |
| 2014/0004793 A1 | 1/2014 | Bandyopadhyay et al. | |
| 2014/0091987 A1 | 4/2014 | Lee et al. | |
| 2014/0092885 A1 | 4/2014 | Venkatachalam et al. | |
| 2014/0176981 A1 | 6/2014 | Asai | |
| 2015/0304805 A1 | 10/2015 | Suzuki et al. | |
| 2016/0011830 A1 | 1/2016 | Asakura | |
| 2016/0157230 A1 | 6/2016 | Nord et al. | |
| 2017/0208431 A1 | 7/2017 | Suzuki et al. | |

FOREIGN PATENT DOCUMENTS

| | | |
|---|---|---|
| CN | 103369171 A | 10/2013 |
| CN | 103369637 A | 10/2013 |
| JP | 2003-198568 A | 7/2003 |
| JP | 2007-166538 A | 6/2007 |
| JP | 2011-146991 A | 7/2011 |
| JP | 2012-134932 A | 7/2012 |
| JP | 2013214804 A | 10/2013 |
| JP | 2014-93567 A | 5/2014 |
| WO | 2010/008251 A2 | 1/2010 |
| WO | 2012011289 A1 | 1/2012 |
| WO | 2013052641 A2 | 4/2013 |

OTHER PUBLICATIONS

"Understanding the Network Terms SSID, BSSID, and ESSID", Juniper Networks, Oct. 15, 2013.
Official Action dated Oct. 10, 2016 received from the Chinese Patent Office in related CN201310451519.7 together with English language translation.
Extended European Search Report dated Jun. 6, 2014 from related European Application No. 13 18 5998.5.
U.S. Appl. No. 15/461,843, filed Mar. 17, 2017.
Japanese Office Action dated Feb. 7, 2017 from related JP 2013271752.
European Office Action dated May 20, 2016 from related EP 14 200 176.7.
Extended European Search Report dated Jul. 28, 2015 from related EP 14200176.7 from related U.S. Appl. No. 14/580,473.
Ex Parte Quayle Office Action dated Nov. 4, 2016 from related U.S. Appl. No. 14/580,473.
Notice of Allowance dated Jan. 25, 2016 from related U.S. Appl. No. 14/580,473.
Notice of Allowance dated Dec. 9, 2016 from related U.S. Appl. No. 15/153,523.
Notice of Allowance dated Apr. 24, 2017 from related U.S. Appl. No. 15/153,523.
Notice of Allowance dated May 16, 2017 from related U.S. Appl. No. 15/153,523.
Office Action dated Jul. 27, 2016 from related U.S. Appl. No. 15/153,523.
Notice of Allowance dated Mar. 13, 2018 from related U.S. Appl. No. 15/461,843, 8 pages.
Chinese Office Action dated Mar. 28, 2018 from corresponding Chinese Patent Application No. 201410836690.4.
Japanese Official Action dated Sep. 5, 2018 from related JP 2017-227609 together with English language translation.
Notice of Allowance dated Jul. 16, 2018 from related U.S. Appl. No. 15/461,843.

* cited by examiner

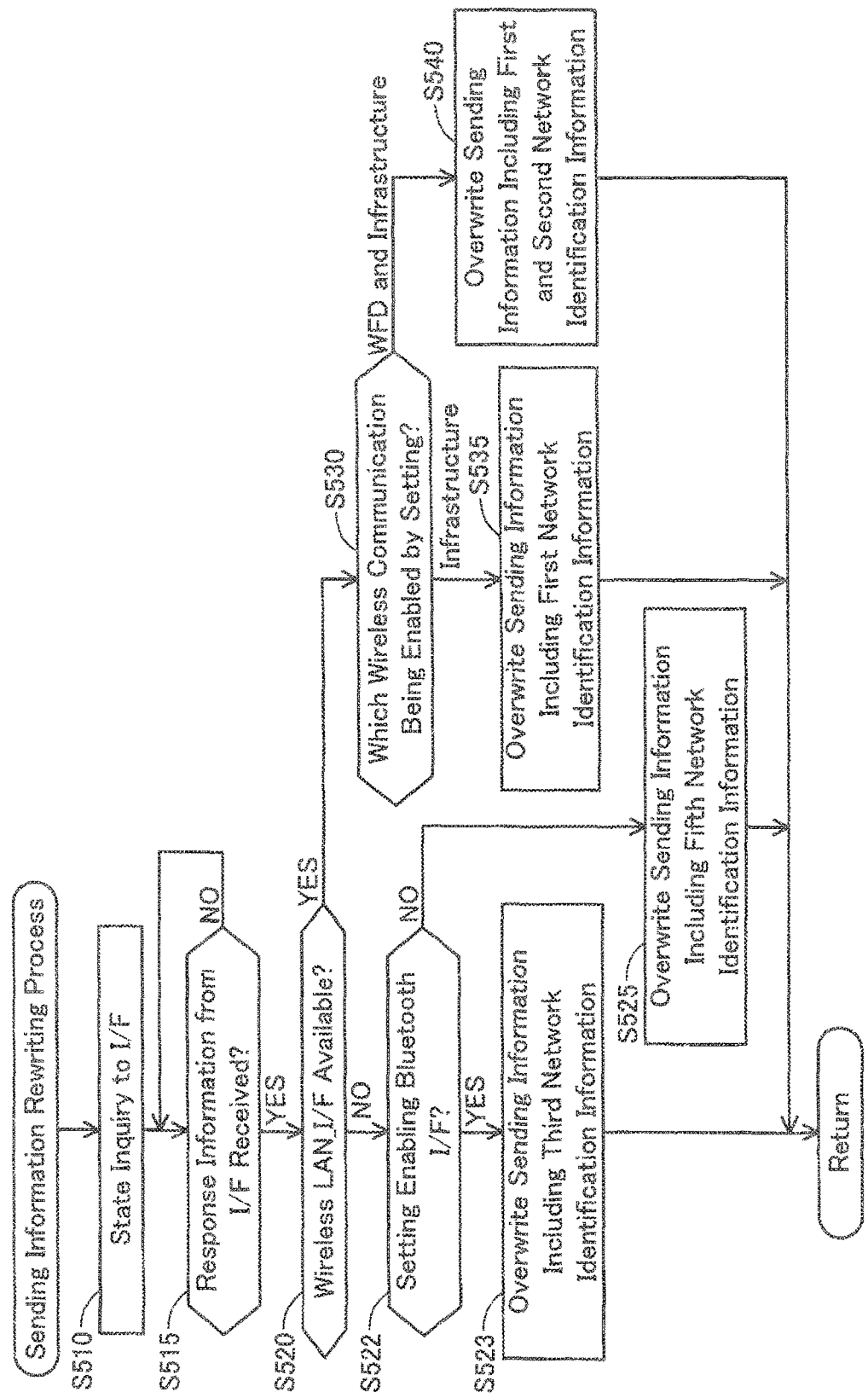

COMMUNICATION SYSTEM, COMMUNICATION DEVICE, AND NON-TRANSITORY COMPUTER-READABLE STORAGE MEDIUM STORING INSTRUCTIONS FOR INFORMATION PROCESSING DEVICE

CROSS REFERENCE TO RELATED APPLICATION

This application is a continuation application of U.S. patent application Ser. No. 15/153,523, filed on May 12, 2016, which is a continuation application of U.S. patent application Ser. No. 14/580,473, filed on Dec. 23, 2014, now issued as U.S. Pat. No. 9,350,813, which claims priority to Japanese Patent Application No. 2013-271752, filed on Dec. 27, 2013, the entire contents of each of which are hereby incorporated by reference into the present application.

TECHNICAL FIELD

The technique disclosed in the present specification relates to a communication system, a communication device, and an information processing program for performing a communication with a communication device.

DESCRIPTION OF RELATED ART

A system is disclosed which includes a gate installed in a museum or the like, a mobile communication terminal, an access point, and a content server. The gate includes a reader writer, and performs a communication with a contactless IC chip of the mobile communication terminal to send an SSID of the access point and a URL of the content server to the mobile communication terminal. The mobile communication terminal establishes a communication with the access point, and accesses the URL of the content server. Thereby, the mobile communication terminal can acquire content data from the content server via the access point.

SUMMARY

The present specification discloses a technique enabling an information processing device and a communication device to appropriately perform a wireless communication of target data.

One technique disclosed in the present application is a communication system comprising an information processing device and a communication device. The communication device may comprise a first interface configured to perform communication with the information processing device using a first wireless communication scheme. The first interface may be configured to function as an Integrated Circuit tag. The communication device may comprise a second interface configured to perform communication with the information processing device using a second wireless communication scheme. The communication device may comprise a first control device coupled to the first interface and the second interface. The information processing device may comprise a third interface configured to perform communication with the communication device by using the first wireless communication scheme. The information processing device may comprise a fourth interface configured to perform communication with the communication device by using the second wireless communication scheme. The information processing device may comprise a second control device coupled to the third interface and the fourth interface. The first control device may be configured to perform storing, in the first interface, one or more connectable network identification information from among a plurality of network identification information. The plurality of network identification information may indicate various types of networks. Each connectable network identification information may indicate a network to which the communication device is set to be connectable. The plurality of network identification information may include first network identification information for identifying a first network formed by a relay device. The plurality of network identification information may include second network identification information for identifying a second network for directly performing communication between the information processing device and the communication device. The first and second control device may be configured to perform executing communication between the first interface of the communication device and the third interface of the information processing device using the first wireless communication scheme. The first control device may be configured to perform sending the one or more connectable network identification information as stored in the first interface to the information processing device. The first and second control device may be further configured to perform executing communication between the fourth interface of the information processing device and the second interface of the communication device using the second wireless communication scheme and using the second network identified by the second network identification information that was included in the connectable network identification information that was sent to the information processing device, in case that the first network to which the information processing device belongs is not included in one or more networks identified by the one or more connectable network identification information sent to the information processing device. The first and second control device may be configured to perform executing communication between the fourth interface of the information processing device and the second interface of the communication device using the second wireless communication scheme and using the first network to which the information processing device belongs, in case that the first network to which the information processing device belongs is included in the one or more networks identified by the one or more connectable network identification information sent to the information processing device.

BRIEF DESCRIPTION OF THE DRAWINGS

FIGS. 5 to 7 show flowcharts of processes performed by an MFP.

DETAILED DESCRIPTION (Structure of Network 10)

Figure 1:
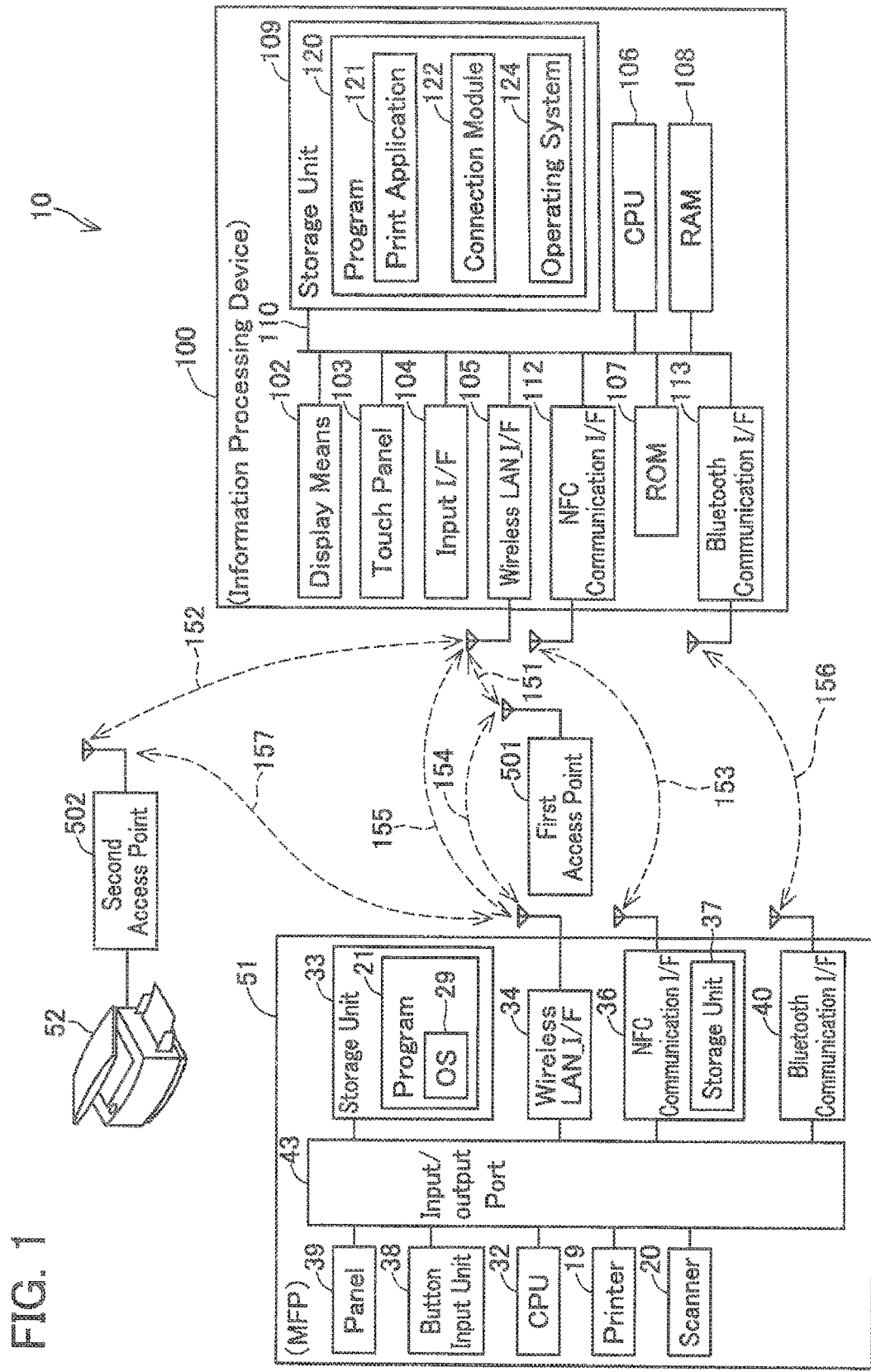
FIG. 1 shows the structure of a communication system.

FIG. 1 is a block view showing the structure of a network 10. The network 10 comprises an information processing device 100, MFPs 51 and 52, a first access point 501, and a second access point 502. Here, MFP indicates a multifunction peripheral device (also called Multifunction Peripheral) comprising a print function, scan function, and copy function.

An NFC communication I/F 112 of the information processing device 100 can perform a communication with an NFC communication I/F 36 of the MFP 51 via an NFC (abbreviation of Near Field Communication) scheme wireless communication 153. In the present embodiment, wireless communication is performed according to the NFC scheme based on International Standard ISO/IEC 21481 or 18092.

A wireless LAN_I/F 105 of the information processing device 100 can communicate with a wireless LAN_I/F 34 of the MFP 51 via infrastructure mode wireless communications 151 and 154. Further, the wireless LAN_I/F 105 can communicate with the MFP 52 via an infrastructure mode wireless communication 152. Further, the wireless LAN_I/F 105 can directly perform a communication with the wireless LAN_I/F 34 of the MFP 51 via a WiFi Direct (referred to as WFD below) scheme wireless communication 155. That is, the information processing device 100 can construct a WFD network by establishing a connection with the MFP 51 in accordance with the WFD scheme. In WFD, wireless communication is performed based on the standard of 802.11 of IEEE (abbreviation of The Institute of Electrical and Electronics Engineers, Inc.), and a standard (e.g., 802.11a, 11b, 11g, or 11n) equivalent to this standard. Further, a bluetooth (registered trademark of Bluetooth SGI Inc. Same below.) communication I/F 113 of the information processing device 100 can perform a communication with a bluetooth communication I/F 40 of the MFP 51 via a bluetooth scheme wireless communication 156.

Each of the first access point 501 and the second access point 502 has an SSID (abbreviation of Service Set Identifier). The SSID is a name for identifying each of the first access point 501 and the second access point 502. By executing a print application 121, the information processing device 100 can send a print request or scan request to the MFPs 51 and 52 by a communication using the wireless LAN_I/F 105 or a communication using the bluetooth communication I/F 113.

(Structure of Information Processing Device 100)

The information processing device 100 is a portable device such as a mobile phone or a portable terminal device. The information processing device 100 comprises a display means 102, a touch panel 103, an input I/F 104, the wireless LAN_I/F 105, the NFC communication I/F 112, the bluetooth communication I/F 113, a CPU (abbreviation of Central Processing Unit) 106, a ROM (abbreviation of Read Only Memory) 107, a RAM (abbreviation of Random Access Memory) 108, a storage unit 109, etc., which are connected with one another via an input/output port 110.

The display means 102 receives an image signal output from the CPU 106, and displays an image based on the received image signal. An LCD, an organic EL panel, etc. may be used as the display means 102. The touch panel 103 is formed of a transparent member, and is disposed so as to cover a surface of the display means 102. The touch panel 103 detects a position touched by the finger or the like of the user, and outputs detected position information to the CPU 106. The input I/F 104 is, e.g., an operation button.

The NFC communication I/F 112 is an interface for performing the NFC scheme wireless communication 153. Various information for communication settings (e.g., IP address, SSID, etc.) are not required in order to establish the NFC scheme wireless communication 153. The wireless LAN_I/F 105 is an interface for performing wireless LAN scheme wireless communications 151, 152, 155. A communicable distance of the wireless LAN scheme wireless communications 151, 152, 155 is greater than a communicable distance of the NFC scheme wireless communication 153. Further, a communication speed of the wireless LAN scheme wireless communications 151, 152, 155 is faster than a communication speed of the NFC scheme wireless communication 153. The bluetooth communication I/F 113 is an interface for performing the bluetooth scheme wireless communication 156.

The CPU 106 executes programs stored in the storage unit 109. The RAM 108 temporarily stores information needed for the processes of the CPU 106. The storage unit 109 is configured such that a flash memory, HDD (abbreviation of Hard Disk Drive), and a buffer or the like provided in the CPU 106, are combined. Image data, document data, etc. can be stored in the storage unit 109. Further, the storage unit 109 is capable of storing access point connection history information. The access point connection history information is information (e.g., an SSID) for identifying an access point with which the information processing device 100 has connected in the past.

Further, the storage unit 109 stores a program 120. The program 120 includes the print application 121, a connection module 122, and an operating system 124 (referred to as OS 124 below). The CPU 106 executes processes in accordance with the program 120. Hereafter, the CPU 106 executing a program such as the print application 121, the connection module 122, the OS 124, etc. may be described simply by the program name. For example, the description "the print application 121" may mean "the CPU 106 that executes the print application 121".

The print application 121 is an application for causing the CPU 106 to perform a process of sending a print request or scan request from the information processing device 100 to the MFP 51, the MFP 52, or the like. The print request is information for causing the MFP 51, the MFP 52, or the like to perform a print process. The scan request is information for causing the MFP 51, the MFP 52, or the like to perform a scan process.

The connection module 122 is a program that executes a process to connect the information processing device 100 with various networks via a wireless communication. The connection module 122 may be a program that is called and executed in various applications such as the print application 121. That is, the connection module 122 may function as a lower-level application that provides a communication function to a higher-level application (e.g., the print application 121) that provides a function close to the user.

The OS 124 is a program that provides a basic function of which use is shared by the print application 121, etc. The OS 124 includes a program for causing the wireless LAN_I/F 105, the NFC communication I/F 112, and the bluetooth communication I/F 113 to perform a wireless communication. Further, the OS 124 is also a program that provides an API (abbreviation of Application Programming Interface) for each program to acquire information acquired by hardware, or for each program to instruct various hardware.

(Structure of MFP 51)

The structure of the MFP 51 will be described. The MFP 51 mainly comprises a CPU 32, a storage unit 33, the wireless LAN_I/F 34, the NFC communication I/F 36, the bluetooth communication I/F 40, a button input unit 38, a panel 39, a printer 19, and a scanner 20. These structural elements are capable of communicating with one another via an input/output port 43.

The CPU 32 executes a program 21 stored in the storage unit 33. The storage unit 33 is configured such that a RAM, ROM, flash memory, HDD (abbreviation of Hard Disk Drive), and a buffer or the like provided in a CPU 32 are combined. The storage unit 33 stores the program 21. The program 21 includes an OS 29, etc.

The wireless LAN_I/F 34 is an interface for performing infrastructure mode wireless communications 154 and 157, and the WFD scheme wireless communication 155. The bluetooth communication I/F 40 is an interface for performing the bluetooth scheme wireless communication 156.

The NFC communication I/F 36 is an interface for performing a wireless communication 153 in accordance with the NFC (abbreviation of Near Field Communication) scheme for so-called short distance wireless communication. The NFC scheme, for example, is a wireless communication scheme based on International Standard ISO/IEC 21481 or 18092. An I/F called an NFC forum device, and an I/F called an NFC forum tag are known as types of I/F for performing an NFC communication. The NFC communication I/F 36 is an NFC forum tag, and functions as an IC (abbreviation of Integrated Circuit) tag of the NFC standard (i.e., ISO/IEC 21481 or 18092).

The NFC communication I/F 36 comprises a storage unit 37. The storage unit 37 is a memory for storing sending information supplied from the CPU 32 for a long period in order to send this sending information to an external device (e.g., the information processing device 100). The storage unit 37 may be a non-volatile memory. The NFC communication I/F 36 can use an RF communication mode and a serial communication mode. In the RF communication mode, the sending information can be sent to an external device. In the serial communication mode, the sending information can be sent from the CPU 32 to the storage unit 37.

An example of the contents of the sending information stored in the storage unit 37 will be shown. The sending information includes sending information identification information, communication execution information, device type identification information, device status information, connectable network identification information, etc. The sending information identification information is information indicating that the sending information is information used in the print application 121. The sending information identification information may be a predetermined character string. The communication execution information is information indicating that the sending information is information for performing the setting of the wireless communication. The communication execution information may be a predetermined character string. The device type identification information is information for identifying the device type of the MFP 51. The device type identification information may be a model name of the MFP 51. The device status information is information indicating device status of the MFP 51. Examples of the information included in the device status information are the contents of an error that occurred in the MFP 51, remaining amount of ink in the printer 19, etc.

The connectable network identification information is information indicating whether there is a network configured to be connectable with the MFP 51. Further, in case there is a network that is configured to be connectable with the MFP 51, the connectable network identification information functions as information for identifying the network that is configured to be connectable. The "network that is configured to be connectable with the MFP 51" is, e.g., a network for which a connection setting of the MFP 51 is set to "connectable". The connection setting may be stored in the storage unit 33. The connection setting may be set to each of the infrastructure mode, WFD scheme, or the bluetooth scheme. The connection setting may be performed by the user, or may be performed automatically by the CPU 32. For example, in case the only network that is connectable with the MFP 51 is a network formed by a wireless communication with the infrastructure mode, the infrastructure mode connection setting may be set to "connectable", and the WFD scheme and bluetooth scheme connection settings may be set to "not-connectable". The state of the connection setting being set to "connectable" may be a state where a wireless communication function in the infrastructure mode using the wireless LAN_I/F 34 has been enabled, a state where a wireless communication function in the WFD scheme using the wireless LAN_ I/F 34 has been enabled, or a state where a wireless communication function using the bluetooth communication OF 40 has been enabled.

The connectable network identification information may include at least any one of first to fifth network identification information shown below. Further, communication destination identification information needed to perform communication with the MFP 51 may be included in each of the first to fourth network identification information.

The first network identification information is information identifying a network formed by the infrastructure mode wireless communication 154. Communication destination identification information (e.g., the SSID of the first access point 501) for connecting with the MFP 51 using the infrastructure mode wireless communication 154 is included in the first network identification information. Further, communication destination identification information for identifying the MFP 51 (e.g., node name of the MFP 51) is included in the first network identification information.

The second network identification information is information identifying a network formed by the WFD scheme wireless communication 155. Communication destination identification information for connecting with the MFP 51 by the WFD scheme wireless communication 155 is included in the second network identification information. Examples of this type of communication destination identification information are an SSID of the WFD network, encryption method, password, etc. The encryption method and password is information for performing device authentication, data encryption, etc. in the WFD network.

The third network identification information is information identifying a network formed by the bluetooth scheme wireless communication 156. Communication destination identification information for connecting with the MFP 51 by the bluetooth scheme wireless communication 156 is included in the third network identification information. An example of this type of communication destination identification information is a MAC address.

The fourth network identification information is information identifying a network formed by the wireless LAN scheme wireless communication 157. Communication destination identification information for connecting with the second access point 502 (e.g., the SSID of the second access point 502), and communication destination identification information for accessing the MFP 51 (e.g., the node name of the MFP 51) are included in the fourth network identification information.

The fifth network identification information is information indicating that a network set so as to be connectable with the MFP 51 does not exist. The fifth network identification information may be a predetermined character string.

The button input unit 38 is a key to perform the functions of the MFP 51. The button input unit 38 may be configured integrally with the panel 39 as a touch panel. The panel 39 displays various function information of the MFP 51. The printer 19 is a member that executes a print process using image data stored in the storage unit 33. The scanner 20 is a member that executes a scan process of reading a document to generate scan data. Moreover, the MFP 52 also has a structure similar to the MFP 51. However, in order to simplify the figures, the MFP 52 is omitted in FIG. 1.

Figure 5:
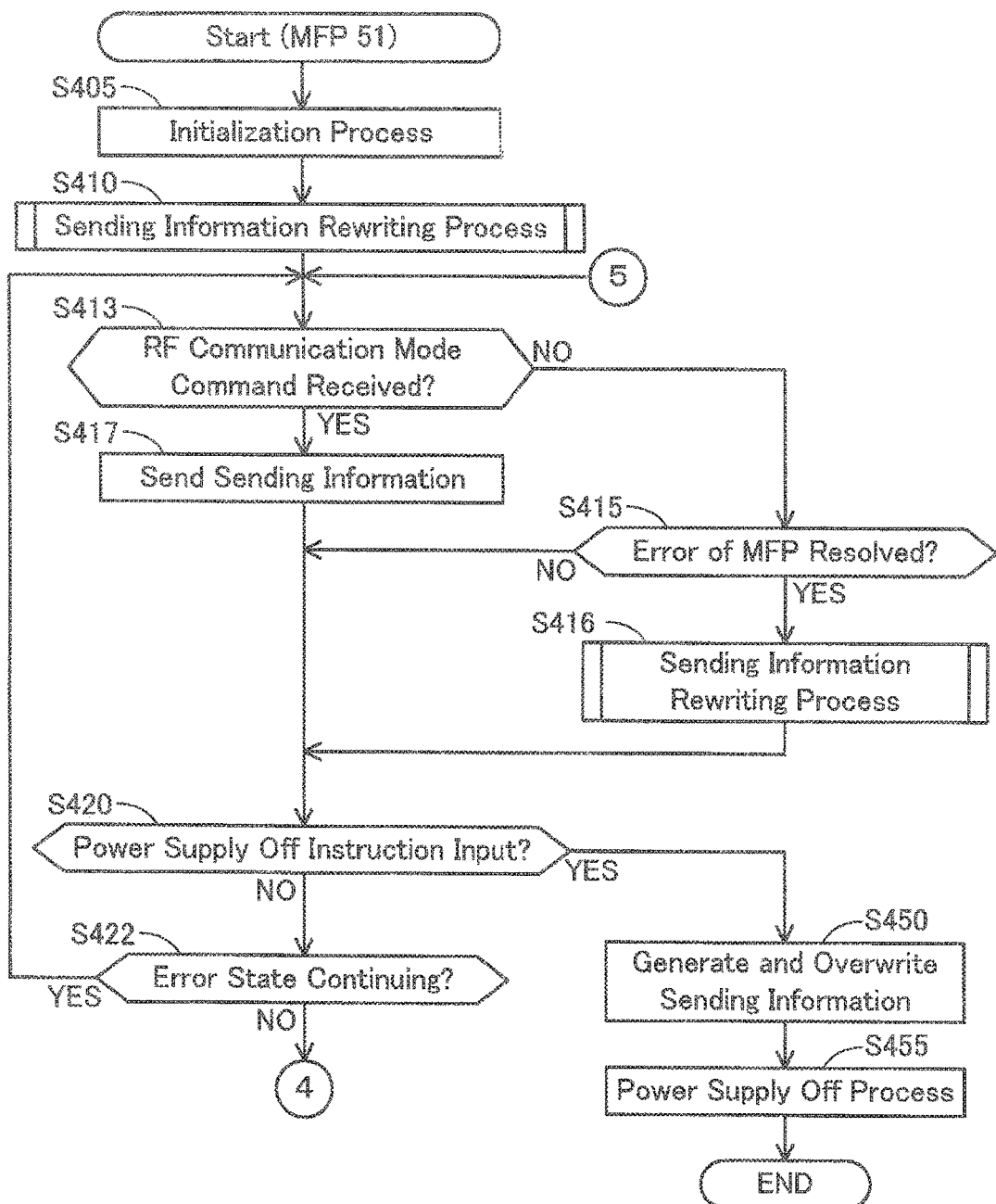
Figure 6:
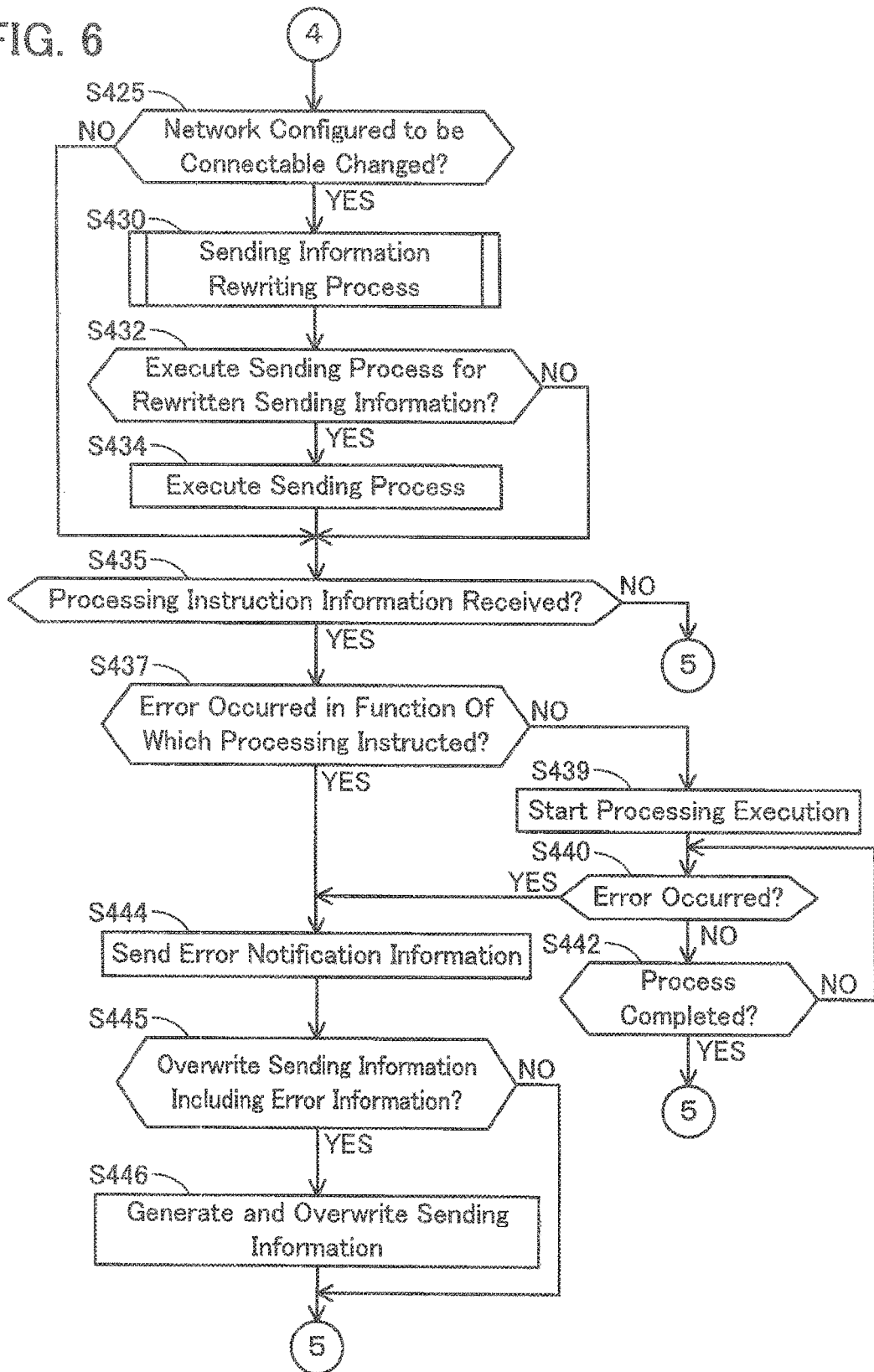

(Processes Performed by MFP 51; FIG. 5 to FIG. 7)

Next, processes performed by the MFP 51 of the present embodiment will be described with reference to FIG. 5 to FIG. 7. In the description of the present embodiment, a case is described in which, from among the infrastructure mode wireless communications 154 and 157, a setting to use the infrastructure mode wireless communication 154 is performed on the MFP 51.

In S405, the CPU 32 executes an initialization process of the MFP 51. In the initialization process, for example, a wireless communication may be established in accordance with the connection setting stored in the storage unit 33. In S410, the CPU 32 executes a rewriting process of the sending information stored in the storage unit 37 in the NFC communication I/F 36.

The contents of the rewriting process of the sending information will be described using FIG. 7. In S510, the CPU 32 makes an inquiry about state to the wireless LAN_I/F 34 and the bluetooth communication I/F 40. In S515, the CPU 32 determines whether response information has been received from the wireless LAN_I/F 34 and the bluetooth communication I/F 40. If a negative determination is made (S515: NO), the process returns to S515, and if a positive determination is made (S515: YES), the process proceeds to S520.

In S520, the CPU 32 determines whether the MFP 51 is set so as to enable the wireless LAN_I/F 34. For example, in case response information indicating an enabled state is received from the wireless LAN_I/F 34, and the connection setting of a network formed by at least one of the wireless communication 154 or 155 is set to "connectable", it may be determined that a setting to enable the wireless LAN_I/F 34 is being performed. If a positive determination is made (S520: YES), the process proceeds to S530.

In S530, the CPU 32 determines the type of wireless communication for which the enabling settings are being performed. Specifically, the CPU 32 determines whether settings enabling both the WFD scheme wireless communication 155 and the infrastructure mode wireless communication 154 are being performed, or whether a setting enabling only the infrastructure mode wireless communication 154 is being performed. If settings enabling wireless communication of both schemes are being performed (S530: WFD and infrastructure), the process proceeds to S540.

In S540, the CPU 32 newly generates sending information. Specifically, the CPU 32 includes the first network identification information (i.e., information identifying the infrastructure mode wireless communication 154), and the second network identification information (i.e., information identifying the WFD scheme wireless communication 155) in the connectable network identification information. The connectable network identification information is information included in the sending information that is generated. Since the contents of the first and the second network identification information have already been described, a description thereof is omitted here. Then, the CPU 32 overwrites the generated sending information in the storage unit 37 using the serial communication mode. Then, the rewriting process of the sending information is ended.

On the other hand, if settings enabling only the infrastructure mode wireless communication 154 are being performed (S530: infrastructure), the process proceeds to S535. In S535, the CPU 32 newly generates sending information. Specifically, the CPU 32 includes the first network identification information (i.e., the information for identifying the infrastructure mode wireless communication 154) in the connectable network identification information. The connectable network identification information is information included in the sending information that is generated. Then, the CPU 32 overwrites the generated sending information in the storage unit 37 using the serial communication mode. Then, the rewriting process of the sending information is ended.

On the other hand, if a negative determination is made in S520 (S520: NO), the process proceeds to S522. In S522, the CPU 32 determines whether a setting enabling the bluetooth communication OF 40 is being performed. For example, if response information indicating the enabled state is received from the bluetooth communication OF 40, and the connection setting of the wireless communication 156 has been set to "connectable", it may be determined that a setting enabling the bluetooth communication I/F 40 is being performed. If a positive determination is made (S522: YES), the process proceeds to S523. In S523, the CPU 32 newly generates sending information. Specifically, the CPU 32 includes the third network identification information (i.e., information identifying the bluetooth scheme wireless communication 156) in the connectable network identification information. The connectable network identification information is information included in the sending information that is generated. Then, the CPU 32 overwrites the generated sending information in the storage unit 37 using the serial communication mode. Then, the rewriting process of the sending information is ended.

On the other hand, if a negative determination is made in S522 (S522: NO), the process proceeds to S525. In S525, the CPU 32 newly generates sending information. Specifically, the CPU 32 includes the fifth network identification information (i.e., information identifying that a network configured to be connectable with the MFP 51 does not exist) in the connectable network identification information. The connectable network identification information is information included in the sending information that is generated. Then, the CPU 32 overwrites the generated sending information in the storage unit 37 using the serial communication mode. Then, the rewriting process of the sending information is ended.

In S413 of FIG. 5, the NFC communication I/F 36 determines whether an RF communication mode command has been received. The RF communication mode command is information for instructing the start of the NFC scheme wireless communication 153. Reception of the RF communication mode command is initiated by an NFC communication I/F provided in a device that is the communication destination approaching a predetermined distance around the NFC communication I/F 36 provided in the MFP 51. The predetermined distance may be, for example, approximately 10 cm. If a negative determination is made (S413: NO), the process proceeds to S415.

In S415, the CPU 32 determines whether the error of the MFP 51 detected in S437 or S440 (to be described) has been resolved. If the error has been resolved (S415: YES), the CPU 32 executes a rewriting process (S416) to rewrite, into new sending information, the sending information that included the device status information including the error contents and that stored in the storage unit 37 in the NFC communication I/F 36. Since the contents of the rewriting process have already been described using FIG. 7, a description thereof is omitted here. Upon ending the process of S416, the CPU 32 moves to the process of S420. Further, if it is determined in S415 that the error has not been resolved (S415: NO), the CPU 32 moves to the process of S420.

On the other hand, if a positive determination is made in S413 (S413: YES), the process proceeds to S417. In S417, the NFC communication I/F 36 sends the sending information stored in the storage unit 37 to the communication destination device via the NFC scheme wireless communication 153, using the RF communication mode.

In S420, the CPU 32 determines whether the input of an instruction to turn off the power supply has been received. The input of this instruction may be received by pressing a power supply button (not shown) provided on the button input unit 38. If a positive determination is made (S420: YES), the process proceeds to S450. In S450, the CPU 32 newly generates sending information. Specifically, the CPU 32 includes the fifth network identification information (i.e., information identifying that a network set to be connectable with the MFP 51 does not exist) in the connectable network identification information. The connectable network identification information is information included in the sending information that is generated. Then, the CPU 32 overwrites the generated sending information in the storage unit 37 using the serial communication mode. In S455, the CPU 32 executes a process to turn off the power supply of the MFP 51. Then, the flow is ended.

On the other hand, if a negative determination is made in S420 (S420: NO), the process proceeds to S422. In S422, the CPU 32 determines whether the error state detected in S437 or S440 (to be described) is continuing. If a positive determination is made (S422: YES), the process returns to S413, and if a negative determination is made (S422: NO), the process moves to S425. Thereby, the state of the sending information including the error information being stored in the storage unit 37 can be maintained while the error state of the MFP 51 is continuing.

In S425, the CPU 32 determines whether the network that is configured to be connectable with the MFP 51 has been changed. The determination may be performed by, e.g., monitoring whether the contents of the connection setting stored in the storage unit 33 have been changed. If a negative determination is made (S425: NO), the process proceeds to S435, and if a positive determination is made (S425: YES), the process proceeds to S430.

In S430, the CPU 32 executes a rewriting process to rewrite the old sending information stored in the storage unit 37 of the NFC communication I/F 36 to new sending information corresponding to the changed connection setting. Since the contents of the rewriting process have already been described using FIG. 7, a description thereof is omitted here.

A case will be described, as a specific operation example, in which a change is made in S425 from a first connection setting, which is connectable with the infrastructure mode and WFD scheme wireless communications, to a second connection setting which is connectable with only the infrastructure mode wireless communication. In the first connection setting, the connection settings of infrastructure mode, WFD scheme, and bluetooth scheme are "connectable", "connectable", and "not-connectable" respectively. Consequently, the first and the second network identification information are included in the connectable network identification information in the sending information before rewriting in S430. On the other hand, in the second connection setting, the connection settings of infrastructure mode, WFD scheme, and bluetooth scheme are "connectable", "not-connectable", and "not-connectable" respectively. Consequently, only the first network identification information is included in the connectable network identification information in the sending information after rewriting in S430.

In S432, the CPU 32 determines whether to execute the sending process for sending the rewritten sending information to the communication destination device. For example, if the rewriting of the sending information has been performed within a predetermined time from the sending information being most recently sent to the communication destination device (S417), it may be determined that the connection setting has been changed in response to a verification by the user of the contents of the sent sending information, and the sending process may be executed. If a negative determination is made (S432: NO), the process proceeds to S435, and if a positive determination is made (S432: YES), the process proceeds to S434.

In S434, the CPU 32 executes the sending process to send the sending information stored in the storage unit 37 to the communication destination device via the NFC scheme wireless communication 153, using the RF communication mode. The sending process may be executed without receiving the RF communication mode command described above. That is, the sending process may be executed without performing the operation of bringing the communication destination device close to the NFC communication I/F 36. The sending process may be executed by, e.g., restarting the NFC communication I/F 36.

In S435, the CPU 32 determines whether processing instruction information has been received from the information processing device 100. The processing instruction information is information for instructing the MFP 51 to execute a process using any one type of function among the various functions such as print process, scan process, etc. If the contents of the processing instruction information are contents to cause the MFP 51 to execute a process using the print function, print data may be included in the processing instruction information. If a negative determination is made (S435: NO), the process returns to S413, and if a positive determination is made (S435: YES), the process proceeds to S437.

In S437, the CPU 32 determines whether an error has occurred in the function of which processing was instructed in the processing instruction information. For example, if the contents of the processing instruction information are contents to cause the MFP 51 to execute a process using the print function, the CPU 32 determines whether an error has occurred in the printer 19.

If a negative determination is made in S437 (S437: NO), the process proceeds to S439. In S439, the CPU 32 starts executing the various processes based on the received processing instruction information. For example, if the processing instruction information instructs the print process, the CPU 32 causes the printer 19 to execute a print process using the print data. Further, e.g., if the processing instruction information instructs the scan process, the CPU 32 causes the scanner 20 to execute a scan process. In S440, the CPU 32 determines whether an error has occurred in the process that is being executed. If a negative determination is made in S440 (S440: NO), the CPU 32 determines in S442 whether that process has been completed. If a negative determination is made in S442 (S442: NO), the process returns to S440, and if a positive determination is made in S442 (S442: YES), the process returns to S413.

On the other hand, if a positive determination is made in S440 (S440: YES), or if a positive determination is made in S437 (S437: YES), the process proceeds to S444. In S444, the CPU 32 sends error notification information, indicating that an error has occurred, to the information processing device 100. The error notification information may be sent to the information processing device 100 using the wireless communication path that received the processing instruction information in S435. In response to receiving the error notification information, the information processing device 100 may cause the display means 102 to display a character string indicating the error contents that occurred.

In S445, the CPU 32 determines whether to overwrite the sending information including the error information in the storage unit 37. Specifically, if an error has occurred in all the functions of which processing can be caused by the print application 121 (e.g., print function and scan function), the CPU 32 determines to overwrite the sending information including the error information. An example of a case of such an error occurring is failure or the like of the power supply or drive circuit of the MFP 51. Further, if an error has occurred in only a part of the functions of which processing can be caused by the print application 121 (e.g., either one of the print function or scan function), the CPU 32 determines not to overwrite the sending information including the error information. Moreover, this case can also be said to be a case of a type of error occurring where the fact of being unable to execute the function cannot be transmitted to the information processing device 100 until wanting to execute a print function using the printer 19, or wanting to execute a scan function using the scanner 20, is confirmed to the MFP 51 by the information processing device 100.

The determination in S445 may be executed in response to the severity of the error. For example, it may be determined to overwrite the sending information including the error information in the storage unit 37 in case of a serious error, and it may be determined to not overwrite the sending information including the error information in case of a minor error. A serious error is an error causing a state such that a process cannot physically be executed. Examples of a serious error are failure of a print head configuring the printer 19, failure of a document sheet transport unit configuring the scanner 20, etc. Examples of a minor error are recording paper out, ink out, etc. Determination of the severity of the error may be made based on error classification information stored in the storage unit 33. The error classification information may e.g., be information in which each type of error that can occur in the MFP 51 is classified into serious error or minor error.

If a negative determination is made in S445 (S445: NO), the process returns to S413, and if a positive determination is made (S445: YES), the process proceeds to S446. In S446, the CPU 32 newly generates sending information. Specifically, the CPU 32 includes, in the device status information, the contents of the error occurring in the MFP 51. The device status information is information included in the sending information that is generated. Then, the CPU 32 overwrites the generated sending information in the storage unit 37 using the serial communication mode, and the process returns to S413.

(Processes Performed by CPU 106 of Information Processing Device 100)

Processes performed by the CPU 106 of the information processing device 100 of the present embodiment will be described with reference to FIG. 2 to FIG. 4. As an example, operation will be described in the case where the information processing device 100 is brought close to the MFP 51. In S110, the CPU 106 determines whether sending information has been received from the MFP 51 via the NFC scheme wireless communication 153. If a negative determination is made (S110: NO), the process returns to S110, and if a positive determination is made (S110: YES), the process proceeds to S112.

In S112, the CPU 106 determines whether the MFP 51 is in the error state. The determination may be performed according to whether the error contents occurring in the MFP 51 are included in the device status information included in the received sending information. If a positive determination is made (S112: YES), the process proceeds to S113. In S113, the print application 121 causes the display means 102 to display an error image. Then, the process returns to S110. An example of an error image of such a case is the character string "An error has occurred in the MFP. Please touch information processing device again to MFP after MFP error has been resolved." If an error is occurring in all the functions of the MFP 51 of which processing can be caused by the print application 121 (e.g., print function and scan function), or if a serious error is occurring in the MFP 51, the information processing device 100 cannot use the functions of the MFP 51 even when having communicated with the MFP 51. In this case, the process to switch wireless communication to communicate with the MFP 51 is useless. Therefore, in the present embodiment, switching of the wireless communication is not performed when the MFP 51 is in a serious error state such as being unable to execute a function.

If a negative determination is made in S112 (S112: NO), the process proceeds to S115. In S115, the CPU 106 starts the print application 121. The starting of the print application 121 may be performed by the OS 124. The starting of the print application 121 may be performed by the OS 124 based on the sending information identification information included in the received sending information. As described above, the sending information identification information is information indicating that the sending information is information used in the print application 121. Further, in case there is a plurality of applications being the start target, the display means 102 may be caused to display images representing each of the plurality of applications, and selection of any one application may be received.

In S120, the print application 121 determines whether the connection of wireless communication was instructed by the sending information received in S110. The determination may be performed according to whether the communication execution information is included in the received sending information. If a negative determination is made (S120: NO), the process proceeds to S125. In S125, the print application 121 determines whether the sending information received in S110 is information indicating that a network configured to be connectable with the MFP 51 exists. If the fifth network identification information is not included in the sending information, it is determined that the sending information is information indicating that a network configured to be connectable with the MFP 51 exists (S125: YES). Therefore, the print application 121 is ended. On the other hand, if the fifth network identification information is included in the sending information, it is determined that the sending information is information indicating that a network configured to be connectable with the MFP 51 does not exist (S125: NO). Therefore, the process proceeds to S170.

In S170, the print application 121 causes the display means 102 to display an error image. An example of the error image is the character string "Please turn on power supply of MFP or turn on wireless setting while touching information processing device to MFP". Then, the process returns to S110.

On the other hand, if a positive determination is made in S120 (S120: YES), the process proceeds to S140. In S140, the print application 121 starts the connection module 122. The operation contents of the connection module 122 will be described later. In S145, the print application 121 notifies the connection module 122 of compatible model information and compatible wireless communication information of the print application 121. The compatible model information is information indicating the type of device that can be controlled by the print application 121. The compatible wireless communication information is information indicating the type of wireless communication that can be used by the print application 121 (e.g., wireless communication of the WFD scheme, wireless communication of the bluetooth scheme, etc.). If the OS 124 is an Android (registered trademark of Google Inc.) OS, communication between the print application 121 and the connection module 122 may be executed using an intent.

In S147, the print application 121 determines whether reply information has been received from the connection module 122. If a negative determination is made (S147: NO), the process returns to S147, and if a positive determination is made (S147: YES), the process proceeds to S150.

In S150, the print application 121 determines whether communication with the MFP 51 is possible using any wireless communication scheme. The determination may be performed based on the contents of the reply information received from the connection module 122. For example, if the communication execution information (S275) has been received as the reply information, it may be determined that infrastructure mode wireless communication is enabled. Further, e.g., if communication destination identification information relating to WFD scheme wireless communication (S316) has been received as the reply information, it may be determined that WFD scheme wireless communication is enabled. Further, e.g., if bluetooth setting information (S336) has been received as the reply information, it may be determined that bluetooth scheme wireless communication is enabled. Further, e.g., if communication unavailable information (S225) has been received as the reply information, it may be determined that wireless communication of any scheme is not enabled. If a negative determination is made (S150: NO), the process proceeds to S170, and if a positive determination is made (S150: YES), the process proceeds to S155.

In S155, the print application 121 creates the processing instruction information. Since the contents of the processing instruction information have already been described in S435, a description thereof is omitted here.

In S160, the print application 121 sends the processing instruction information to the MFP 51 via a wireless communication formed by the connection module 122. Then, the print application 121 ends.

(Operation of Connection Module 122)

The operation of the connection module 122 started in S140 will be described using FIG. 3 and FIG. 4. In S210, the connection module 122 determines whether the compatible model information and the compatible wireless communication information have been received from the print application 121. If a negative determination is made (S210: NO), the process returns to S210, and if a positive determination is made (S210: YES), the process proceeds to S215.

In S215, the connection module 122 determines whether the MFP 51 is a device that can be controlled by the print application 121. The determination may be performed according to whether the device type of the MFP 51 indicated by the device type identification information included in the sending information received in S110 is included in the type of devices that can be controlled by the print application 121 indicated by the compatible model information. If a negative determination is made (S215: NO), the process proceeds to S225. In S225, the connection module 122 sends the communication unavailable information, indicating that no wireless communication is enabled, to the print application 121. Then, the connection module 122 ends.

On the other hand, if a positive determination is made in S215 (S215: YES), the process proceeds to S220. In S220, the connection module 122 determines whether the MFP 51 is in a state allowing wireless communication to be performed. The determination may be performed according to whether the fifth network identification information (i.e., information indicating that a network configured to be connectable with the MFP 51 does not exist) is included in the sending information received in S110. If a positive determination is made (S220: YES), the process proceeds to S240, and if a negative determination is made (S220: NO), the process proceeds to S225.

In S240, the connection module 122 determines whether the MFP 51 is set so as enable the infrastructure mode wireless communication 154. The determination may be performed according to whether the first network identification information (i.e., information identifying the infrastructure mode wireless communication 154) is included in the sending information received in S110. If a positive determination is made (S240: YES), the process proceeds to S245.

In S245, the connection module 122 acquires, from the OS 124, the SSID of the access point with which the information processing device 100 is currently connected. In S250, the connection module 122 determines whether the access point with which the MFP 51 is currently connected, and the access point with which the information processing device 100 is currently connected are the same. The determination may be performed according to whether the SSID of the access point set as the connection destination of the MFP 51, and the SSID of the network with which the information processing device 100 is currently connected are the same. The SSID of the access point set as the connection destination of the MFP 51 may be acquired from the communication destination identification information included in the first network identification information in the sending information received in S110. If a positive determination is made (S250: YES), the process proceeds to S265, and if a negative determination is made (S250: NO), the process proceeds to S255.

In S255, the connection module 122 determines whether an access point for switching that can perform connection switching exists. For example, the presence of an access point for switching, this being an access point registered in the access point connection history information stored in the storage unit 109, may be determined by searching for an access point present in the communication range of the wireless LAN_I/F 105. If a plurality of access points is detected, the access point with which a connection was most recently made may be selected as the access point for switching. If a negative determination is made (S255: NO), the process proceeds to S300, and if a positive determination is made (S255: YES), the process proceeds to S260. Moreover, the access point corresponding to the SSID represented by the communication destination identification information included in the connectable network identification information included in the sending information received in S110 may be found from the access point connection history information as the access point for switching.

In S260, the connection module 122 switches the connection destination of the wireless LAN_I/F 105 to the access point for switching.

In S265, the connection module 122 acquires the IP address of the MFP 51. For example, the node name of the MFP 51 included in the first network identification information may be broadcast, and the IP address of the MFP 51 may be received.

In S270, the connection module 122 establishes the infrastructure mode wireless communications 151 and 154 with the MFP 51. In S275, the connection module 122 sends the communication execution information to the print application 121. The communication execution information is information used for executing the infrastructure mode wireless communications 151 and 154 with the MFP 51. The communication execution information may include, e.g., the SSID of the first access point 501, the model name of the MFP 51, the IP address of the MFP 51, etc. Then, the connection module 122 ends.

On the other hand, if a negative determination is made in S240 or S255 (S240: NO or S255: NO), the process proceeds to S300. In S300, the connection module 122 determines whether the MFP 51 is set so as to enable the WFD scheme wireless communication 155. The determination may be performed according to whether the second network identification information (i.e., information identifying the WFD scheme wireless communication 155) is included in the sending information received in S110. If a positive determination is made (S300: YES), the process proceeds to S305.

In S305, the connection module 122 switches the communication scheme to be used to the WFD scheme wireless communication 155. In S310, the connection module 122 reads the communication destination identification information for using the WFD scheme wireless communication 155 from the second network identification information included in the sending information received in S110.

In S313, the connection module 122 establishes the WFD scheme wireless communication 155 with the MFP 51. In S316, the connection module 122 sends communication destination identification information relating to the WFD scheme wireless communication to the print application 121. Then, the connection module 122 ends.

On the other hand, if a negative determination is made in S300 (S300: NO), the process proceeds to S320. In S320, the connection module 122 determines whether the MFP 51 is set so as to enable the bluetooth scheme wireless communication 156. The determination may be performed according to whether the third network identification information (i.e., information identifying the bluetooth scheme wireless communication 156) is included in the sending information received in S110. If a negative determination is made (S320: NO), the process proceeds to S225, and if a positive determination is made (S320: YES), the process proceeds to S325.

In S325, the connection module 122 switches the communication scheme to be used to the bluetooth scheme wireless communication 156. In S333, the connection module 122 establishes the bluetooth scheme wireless communication 156 with the MFP 51. In S336, the connection module 122 sends bluetooth setting information to the print application 121. The MAC address is included in the bluetooth setting information. Then, the connection module 122 ends.

(Achieved Effects)

If the access point to which the information processing device 100 is currently connected and the access point to which the MFP 51 is currently connected are the same (S250: YES), infrastructure mode wireless communication can be performed via that same access point (S270). Thereby, since the network switching process (e.g., S305, S325) does not occur, the time required for communication can be shortened. Further, if the access point to which the information processing device 100 is currently connected and the access point to which the MFP 51 is currently connected are not the same (S250: NO), it is possible to switch to another communication scheme set so as to be connectable with the MFP 51 (S305, S325), and execute a communication. Thereby, communication between the information processing device 100 and the MFP 51 can be performed appropriately.

In response to the setting contents defining the network that is connectable with the MFP 51 being changed (S425: YES), the contents of the connectable network identification information included in the sending information stored in the storage unit 37 of the NFC communication OF 36 can be rewritten to the changed setting contents (S430). That is, the setting contents defining the network that is connectable with the MFP 51, which are stored in the storage unit 37, can be updated in real time. Thereby, even if the setting defining the network that is connectable with the MFP 51 changes, communication between the information processing device 100 and the MFP 51 can be performed appropriately.

In response to the change of the contents of the connectable network identification information included in the sending information stored in the storage unit 37 of the NFC communication I/F 36 (S425: YES), the sending information including the changed connectable network identification information can be sent to the information processing device 100 from the MFP 51 (S434). Thereby, since the most recent connectable network identification information can always be maintained in the information processing device 100, communication between the information processing device 100 and the MFP 51 can be performed appropriately.

The sending information including the communication destination identification information needed to perform communication with the MFP 51 can be sent to the information processing device 100 from the MFP 51 (S417, S110). Thereby, it is possible to appropriately cause the information processing device 100 to execute a process for starting to perform a communication with the MFP 51 by using the communication destination identification information (S265, S310, S325). Specifically, it is possible to cause the information processing device 100 to establish the infrastructure mode wireless communications 151 and 154 with the MFP 51 (S270) by using the SSID of the first access point 501 and the IP address of the MFP 51. Further, it is possible to cause the information processing device 100 to establish the WFD scheme wireless communication 155 with the MFP 51 (S313) by using the SSID, encryption method, password, etc. of the WFD network.

The information processing device 100 comprises the NFC communication I/F 112, and the MFP 51 comprises the NFC communication I/F 36. Thereby, it is possible to cause the information processing device 100 to acquire the sending information including the connectable network identification information by an intuitive and simple operation such as bringing the information processing device 100 close to the MFP 51 (S417, S110).

If a network that is configured to be connectable with the MFP 51 does not exist, the fifth network identification information indicating that a network configured to be connectable with the MFP 51 does not exist can be overwritten in the storage unit 37 (S525 or S450). Thereby, the fact that it is not possible to connect with the MFP 51 via a wireless communication can be notified to the information processing device 100 (S110), and be displayed on the display means 102 of the information processing device 100 (S170). Therefore, convenience to the user can be increased. Examples of a network that is configured to be connectable with the MFP 51 not existing are the case where none of the wireless communications of the MFP 51 is enabled (S522: NO), or the case where the power supply of the MFP 51 is off (S420: YES). Further, since the NFC communication I/F 36 functions as an IC tag, the sending information can be sent to the information processing device 100 in response to the information processing device 100 coming close even after the power supply of the MFP 51 has been turned off. Consequently, when the power supply of the MFP 51 is off (S420: YES), it is possible to notify the information processing device 100 that it is not possible to connect with the MFP 51 via a wireless communication, due to the power supply of the MFP 51 being in an off state, by overwriting the sending information including the fifth network identification information in the storage unit 37 (S450), even after the power supply of the MFP 51 has been turned off.

If an error has occurred in all the functions which the print application 121 can be made to process (S445: YES), processing for the information processing device 100 to start a communication with the MFP 51 becomes unnecessary, because the MFP 51 cannot be made to execute a process using any function. Therefore, in this case, sending information that includes the contents of the error occurring in the MFP 51 can be overwritten in the storage unit 37 (S446). Thereby, since it is possible to recognize that the MFP 51 is in the error state (S112: YES), the information processing device 100 can prevent the execution of the unnecessary process of starting a communication with the MFP 51.

If an error has occurred in only a part of the functions of which processing can be caused by the print application 121 (S445: NO), the processing instruction information is received from the information processing device 100 (S435: YES), and it is necessary to confirm whether an error is occurring in the function of which process execution was instructed by the processing instruction information. Therefore, in this case, sending information that includes the contents of the error occurring in the MFP 51 need not be overwritten in the storage unit 37 (S445: NO). Thereby, since the communication with the MFP 51 can be started (S112: NO), the information processing device 100 can send the processing instruction information to the MFP 51. Then, if it is determined that an error is occurring in the function of which process execution was instructed by the processing instruction information (S437: YES), the error notification information can be sent to the information processing device 100 (S444). Thereby, it is possible to notify the user that, due to an error, the function of which process execution was instructed by the user, cannot be used.

The connection module 122 can be started by being called by the print application 121, which is a higher-level application (S115). Then, the connection module 122 can execute a wireless communication connection process (S210 to S336), and return information identifying the connection result to the print application 121 (S275, S225, S316, S336). Thereby, since the connection module 122 can be shared by a plurality of higher-level applications, the functions of the higher-level applications can be simplified.

If the type of the MFP 51 is a type not compatible with the print application 121 (S215: NO), it is possible to cause the display means 102 of the information processing device 100 to display an image indicating that a wireless connection cannot be made with the MFP 51 (S150: NO, S170). Thereby, convenience to the user can be increased.

When the access point to which the MFP 51 is currently connected and the access point to which the information processing device 100 is currently connected are not the same (S250: NO), the connection module 122 can switch to the access point for switching, allowing wireless communication to be performed (S260). For example, if the MFP 51 is currently connected to the second access point 502, and the information processing device 100 is currently connected to the first access point 501, the connection module 122 can switch the connection destination of the wireless LAN_I/F 105 to the second access point 502 (S260). Thereby, the information processing device 100 and the MFP 51 can communicate via wireless communications 152 and 157. Therefore, redundancy can be supplied to the network 10.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

(Modifications)

In the present embodiment, a case was described in which the WFD scheme wireless communication was used in preference to the bluetooth scheme wireless communication, but the case is not limited to this configuration. The bluetooth scheme wireless communication may be used in preference to the WFD scheme wireless communication. In this case, if a negative determination is made in S240 or S255 (S240: NO, or S255: NO), the process may proceed to S320. Then, if a negative determination is made in S320 (S320: NO), the process may proceed to S300.

In the present embodiment, the description was given using the MFP 51 as an example of the "communication device" that communicates with the information processing device 100. However, the case is not limited to this configuration. The "communication device" may be a label printer, scanner, copier, portable terminal, PC, server, etc.

The timing at which the connection module 122 acquires, from the OS 124, the SSID of the network with which the information processing device 100 is currently connected is not limited to the timing of S245. For example, the SSID of the network may be acquired at the timing when the connection module 122 is started.

In S450, the information included in the connectable network identification information is not limited to the fifth network identification information. Information indicating that the power supply of the MFP 51 is off may be included.

The determination process executed in S112 is not limited to being executed by the print application 121, but may be executed by the connection module 122. In this case, in S220, the connection module 122 may additionally execute the determination process executed in S112.

In S530, it may be determined whether only a setting enabling the WFD scheme wireless communication 155 is being performed. Then, if only a setting enabling the WFD scheme wireless communication 155 is being performed, sending information including the second network identification information may be overwritten in the storage unit 37.

The setting for using the infrastructure mode wireless communication 157 may be performed by the MFP 51. In this case, in S535 and S540, the fourth network identification information (i.e., information identifying the infrastructure mode wireless communication 157) may be included instead of the first network identification information in the connectable network identification information.

Communication between the first access point 501 and the MFP 51, and communication between the second access point 502 and the MFP 52 may be performed either wirelessly or wired.

The information processing device 100 may have a configuration connectable with an external memory such as a memory card. Then, the configuration may be such that various data is stored in the external memory instead of the storage unit 109.

Figure 2:
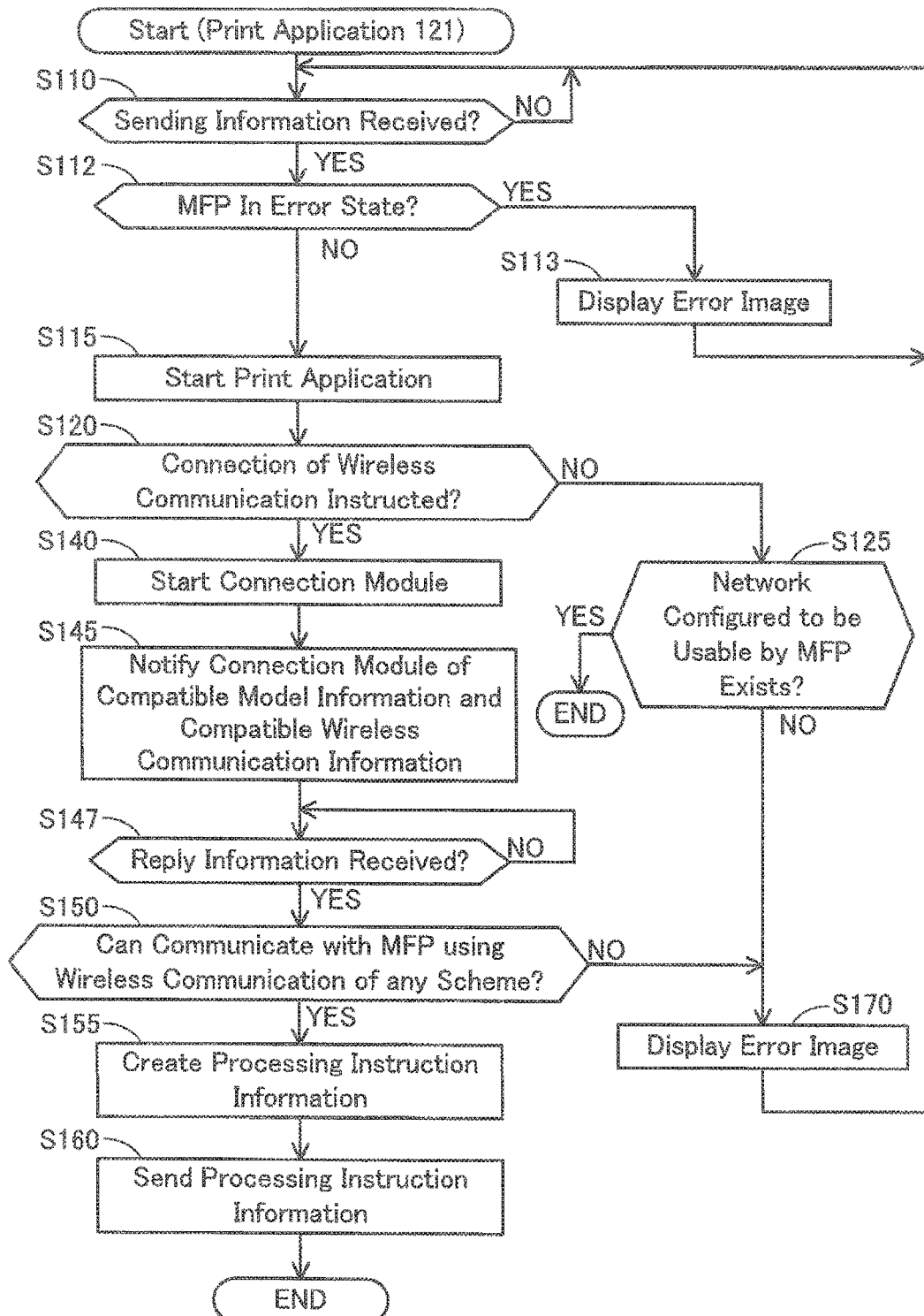
FIGS. 2 to 4 show flowcharts of processes performed by an information processing device.
Figure 3:
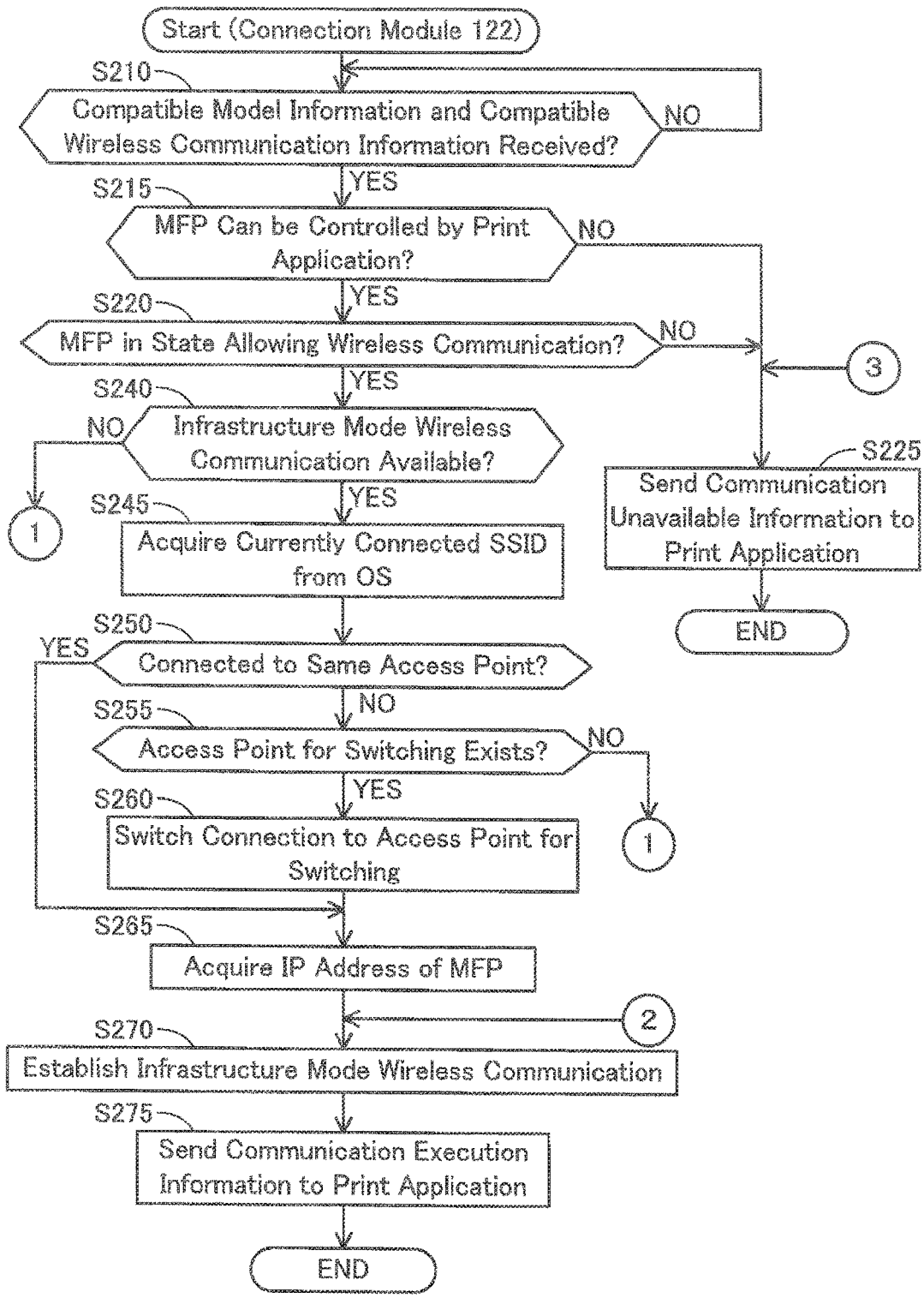
Figure 4:
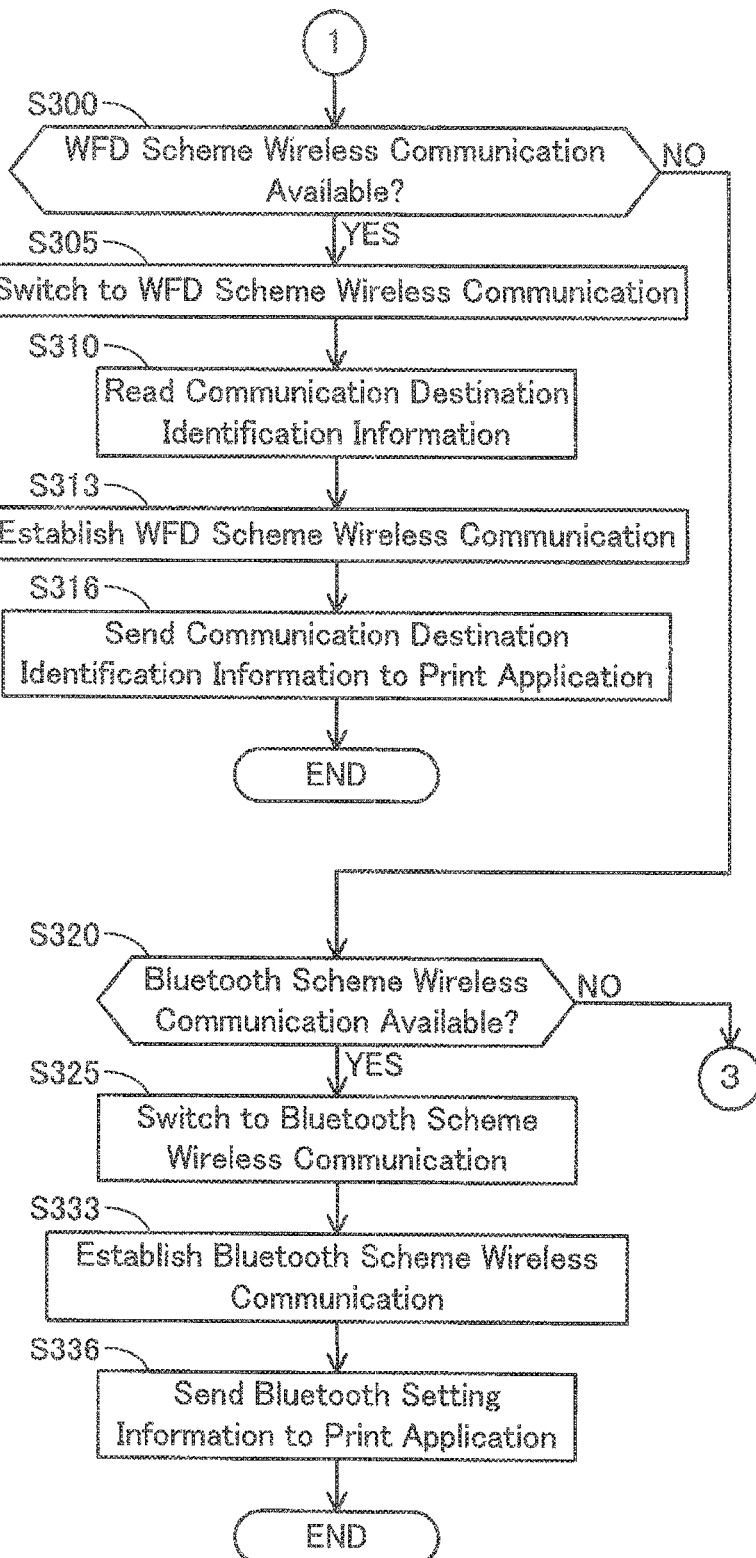

In the embodiment described above, the CPU 106 of the information processing device 100 realizes the processes of FIG. 2 to FIG. 4 by executing the program 120 (i.e., software) within the storage unit 109. Instead, at least one of the processes of FIG. 2 to FIG. 4 may be realized by hardware such as a logic circuit.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

The invention claimed is:

1. A communication device comprising:
a first wireless interface configured to perform communication with an information processing device using a first wireless communication scheme, the first wireless interface comprising a storage unit and being configured to function as an Integrated Circuit tag;
a second wireless interface configured to perform communication with the information processing device using a second wireless communication scheme; and
a control device coupled to the first wireless interface and the second wireless interface, wherein the control device is configured to perform storing specific information in the storage unit of the first wireless interface in response to content of connection setting having been changed,
wherein:
the first wireless interface is configured to perform sending the specific information which have been stored in the storage unit to the information processing device,
the specific information being used by the information processing device for determining whether the communication device and the information processing device are currently communicable or not via the second wireless interface by using a first wireless network, and
the first wireless network being a wireless network via an access point,
in a case where it is determined that the communication device and the information processing device are currently communicable via the second wireless interface by using the first wireless network, the control device is further configured to perform:
communicating object data with the information processing device via the second wireless interface using the first wireless network to which the information processing device and the communication device belong, after the specific information have been sent.

2. The communication device according to claim 1, wherein the specific information includes communication destination identification information for identifying the communication device.

3. The communication device according to claim 1, wherein the specific information includes an SSID of the access point.

4. The communication device according to claim 1, wherein the control device is configured to further perform storing new information in the storage unit when a specific condition is satisfied in the communication device.

5. The communication device according to claim 4, wherein the specific condition includes at least one of:
power state of the communication device shifting from ON to OFF or from OFF to ON; and
a state of the communication device shifting from an error state to a non-error state where the error has been resolved or from the non-error state to the error state.

6. The communication device according to claim 1, wherein the first wireless interface is an interface executing a communication in accordance with a Near Field Communication standard.

7. The communication device according to claim 1, wherein:
the communication device further comprises a printer,
the object data includes print data, and
the control device is configured to further perform causing the printer to execute a print process using the received print data.

8. The communication device according to claim 1, wherein:
the communication device further comprises a scanner,
the object data includes scan data,
the control device is further configured to perform causing the scanner to execute a scan process and generate the scan data, and
the communicating of the object data includes sending the scan data to the information processing device via the second wireless interface.

9. The communication device according to claim 1, wherein the content of the connection setting includes information indicating whether or not specific network in which the communication device is set to be connectable exists, and
wherein in the specific network, the communication device communicates, not via an access point, with the information processing apparatus.

10. A non-transitory computer-readable storage medium storing instructions for an information processing device, the information processing device comprising:
a first wireless interface configured to perform communication with a specific wireless interface of a communication device using a first wireless communication scheme, the specific wireless interface comprising a storage unit and being configured to function as an Integrated Circuit tag, and the storage unit being configured to perform storing specific information in response to content of connection setting having been changed;
a second wireless interface configured to perform communication with the communication device using a second wireless communication scheme; and
a processor, wherein the instructions, when executed by the processor, cause the information processing device to perform:
receiving the specific information which have been stored in the storage unit from the communication device via the first wireless interface;
determining, using the received specific information whether the communication device and the information processing device are currently communicable or not via the second wireless interface by using a first wireless network, the first wireless network being a wireless network via an access point; and
in a case where it is determined in the determining that the communication device and the information processing device are currently communicable, communicating object data with the communication device via the second wireless interface using the first wireless network to which the information processing device and the communication device belong, after the specific information have been received.

11. The non-transitory computer-readable storage medium according to claim 10, wherein the specific information includes communication destination identification information for identifying the communication device.

12. The non-transitory computer-readable storage medium according to claim 10, wherein the specific information includes an SSID of the access point.

13. The non-transitory computer-readable storage medium according to claim 10, wherein the first wireless interface is an interface executing a communication in accordance with a Near Field Communication standard.

14. The non-transitory computer-readable storage medium according to claim 10, wherein:
the object data includes print data for executing a printing by a printer of the communication device.

15. The non-transitory computer-readable storage medium according to claim 10, wherein:
the object data includes scan data generated by scanning a document by a scanner of the communication device, and
the communicating of the object data using includes receiving the scan data from the communication device via the second wireless interface.

16. The non-transitory computer-readable storage medium according to claim 10,
wherein the content of the connection setting includes information indicating whether or not specific network in which the communication device is set to be connectable exists, and wherein in the specific network, the communication device communicates, not via an access point, with the information processing apparatus.

17. An information processing device comprising:
a first wireless interface configured to perform communication with a specific wireless interface of a communication device using a first wireless communication scheme, the specific wireless interface comprising a storage unit and being configured to function as an Integrated Circuit tag, and the storage unit being configured to perform storing specific information in response to content of connection setting having been changed;
a second wireless interface configured to perform communication with the communication device using a second wireless communication scheme; and
a control device coupled to the first wireless interface and the second wireless interface,
wherein the control device is configured to perform:
receiving the specific information which have been stored in the storage unit from the communication device via the first wireless interface;
determining, using the received specific information, whether the communication device and the information processing device are currently communicable or not via the second wireless interface by using a first wireless network, the first wireless network being a wireless network via an access point; and
in a case where it is determined in the determining that the communication device and the information processing device are currently communicable, communicating object data with the communication device via the second wireless interface using the first wireless network to which the information processing device and the communication device belong, after the specific information have been received.

18. The information processing device according to claim 17,
wherein the content of the connection setting includes information indicating whether or not specific network in which the communication device is set to be connectable exists, and
wherein in the specific network, the communication device communicates, not via an access point, with the information processing apparatus.

* * * * *